United States Patent
Vargas et al.

(10) Patent No.: US 11,589,227 B2
(45) Date of Patent: Feb. 21, 2023

(54) MULTILEVEL AUTHENTICATION USING A MOBILE DEVICE

(71) Applicant: KYNDRYL, INC., New York, NY (US)

(72) Inventors: Juan F. Vargas, Cary, NC (US); Mark E. Maresh, Wake Forest, NC (US); Michael J. Whitney, Cary, NC (US); Colm Nolan, Navan (IE)

(73) Assignee: KYNDRYL, INC., New York, NY (US)

( * ) Notice: Subject to any disclaimer, the term of this patent is extended or adjusted under 35 U.S.C. 154(b) by 350 days.

(21) Appl. No.: 16/787,147

(22) Filed: Feb. 11, 2020

(65) Prior Publication Data

US 2021/0250765 A1     Aug. 12, 2021

(51) Int. Cl.
    *H04W 12/06*         (2021.01)
    *H04W 12/069*      (2021.01)
    (Continued)

(52) U.S. Cl.
    CPC ......... *H04W 12/069* (2021.01); *H04L 63/083* (2013.01); *H04L 63/0853* (2013.01);
    (Continued)

(58) Field of Classification Search
    CPC ..... H04W 12/069; H04W 12/71; G06F 16/24; H04L 63/083; H04L 63/0853; H04L 63/18; H04L 63/20; H04L 63/0823
    (Continued)

(56) References Cited

U.S. PATENT DOCUMENTS

| 8,769,657 B2 | 7/2014 | Zaitsev |
| 9,367,975 B2 | 6/2016 | Robertson |

(Continued)

FOREIGN PATENT DOCUMENTS

| CA | 2751893 C | 8/2017 |
| CN | 103810778 A | 5/2014 |

(Continued)

OTHER PUBLICATIONS

Kisi Access Control Introduction, Kisi Office Security, Apr. 19, 2019, Retrieved from YouTube, 1 page, <https://www.youtube.com/watch?v=z-rRtnT7xyQ>.

(Continued)

*Primary Examiner* — Jeffrey C Pwu
*Assistant Examiner* — Nega Woldemariam
(74) *Attorney, Agent, or Firm* — John Kennel; Andrew M. Calderon; Calderon Safran & Cole P.C.

(57) ABSTRACT

A computer-implemented method, a computer program product, and a computer system for using a mobile device to authenticate a user to access a secure facility. An authentication service determines whether the mobile device of the user is locked. The authentication service requests the user to unlock the mobile device and determines whether the user has unlocked the mobile device. The authentication service retrieves, from the mobile device, a first token and a MAC address. The authentication service retrieves, from a database, a token identifier of the mobile device and a personal identifier of the user. The authentication service generates a second token, based on the token identifier, the personal identifier, and the MAC address. The authentication service determines whether the first and the second tokens match. The authentication service grants the user access to the secure facility, in response to the first and the second tokens matching.

17 Claims, 7 Drawing Sheets

(51) Int. Cl.
*H04L 9/40* (2022.01)
*H04W 12/71* (2021.01)

(52) U.S. Cl.
CPC .............. *H04L 63/18* (2013.01); *H04L 63/20* (2013.01); *H04W 12/71* (2021.01)

(58) Field of Classification Search
USPC .......................................................... 726/1
See application file for complete search history.

(56) References Cited

U.S. PATENT DOCUMENTS

| | | | |
|---|---|---|---|
| 11,140,157 B1* | 10/2021 | Xia | ..................... H04L 63/0853 |
| 2009/0265775 A1 | 10/2009 | Wisely | |
| 2013/0214898 A1 | 8/2013 | Pineau | |
| 2014/0365781 A1 | 12/2014 | Dmitrienko | |
| 2016/0042170 A1 | 2/2016 | Farraro | |
| 2016/0189454 A1 | 6/2016 | Johnson | |
| 2019/0075463 A1* | 3/2019 | Oh | ...................... H04L 63/0853 |
| 2019/0089693 A1* | 3/2019 | Ding | ....................... G06F 21/44 |

FOREIGN PATENT DOCUMENTS

| | | |
|---|---|---|
| CN | 103236094 B | 9/2015 |
| CN | 107067520 A | 8/2017 |

OTHER PUBLICATIONS

Mell et al., "The NIST Definition of Cloud Computing", National Institute of Standards and Technology, Special Publication 800-145, Sep. 2011, 7 pages.

* cited by examiner

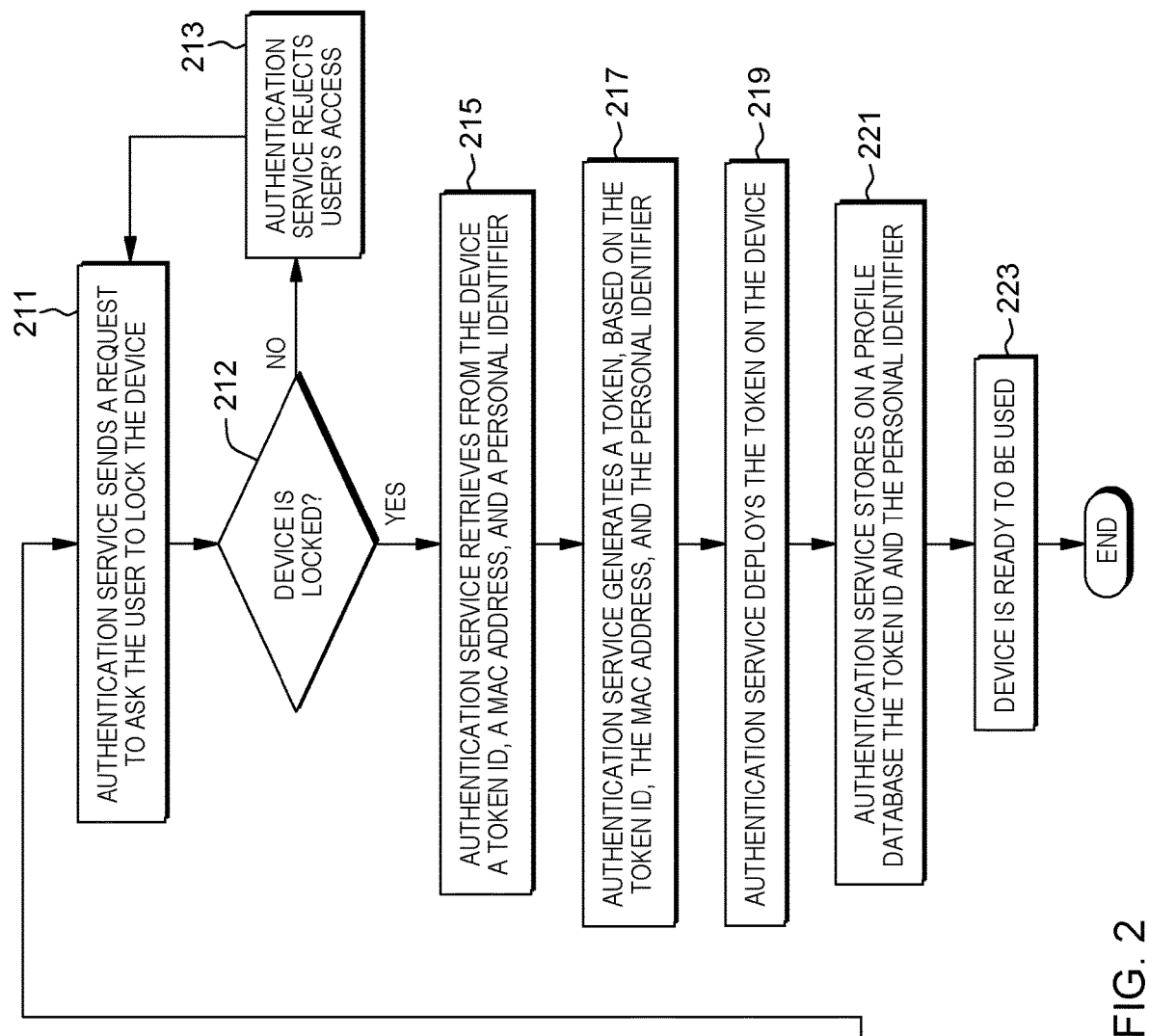
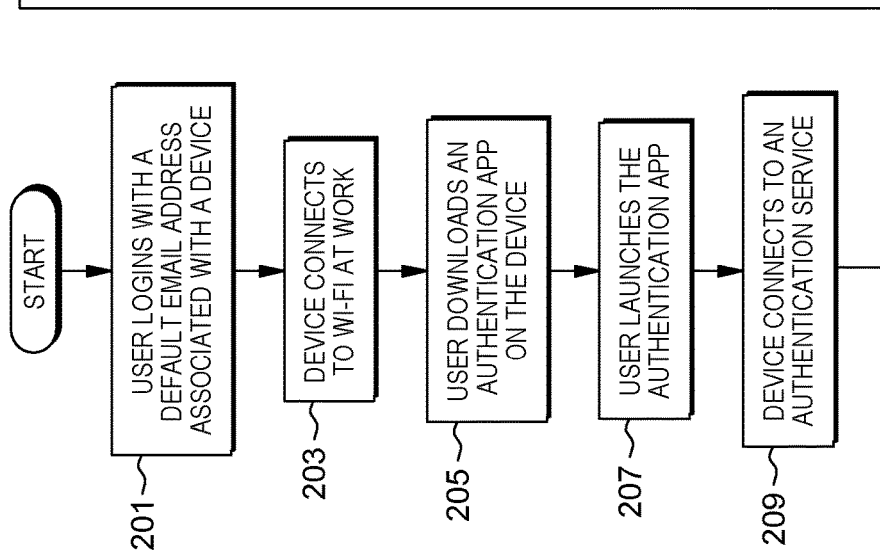
FIG. 2

MULTILEVEL AUTHENTICATION USING A MOBILE DEVICE

BACKGROUND

The present invention relates generally to multilevel authentication, and more particularly to using a mobile device to authenticate a user to access a secure facility.

Most common methods of accessing buildings or secure facilities are based on the usage of badge readers which detect information within cards. The badge readers are connected to datacenters to validate certain parameters obtained from the cards. A problem of the methods based on the usage of badge readers is that losing badges or cards allows unauthorized individuals to get access to the secure facilities.

Other types of authentication technologies are based on the utilization of some biometric data (such as fingerprints) captured from individuals who access buildings through secure access entries. A problem of the methods based on the utilization of some biometric data is that sensitive data is collected by central systems.

SUMMARY

In one aspect, a computer-implemented method for using a mobile device to authenticate a user to access a secure facility is provided. The computer-implemented method is implemented by an authentication service. The computer-implemented method includes determining whether the mobile device of the user is locked when the user approaches the secure facility and when the mobile device is connected to the authentication service through a wireless network at the secure facility. The computer-implemented method further includes requesting the user to unlock the mobile device and determining whether the user has unlocked the mobile device, in response to determining that the mobile device is locked. The computer-implemented method further includes retrieving, from the mobile device, a first token and a media access control (MAC) address, in response to determining that the user has unlocked the mobile device. The computer-implemented method further includes retrieving, from a database of the authentication service, a token identifier registered for the mobile device and a personal identifier registered for the user. The computer-implemented method further includes generating a second token, based on the token identifier and the personal identifier retrieved from the database and based on the media access control (MAC) address retrieved from the mobile device. The computer-implemented method further includes determining whether the first token and the second token match. The computer-implemented method further includes granting the user access to the secure facility, in response to determining that the first token and the second token match.

In another aspect, a computer program product for using a mobile device to authenticate a user to access a secure facility is provided. The computer program product comprising one or more computer-readable tangible storage devices and program instructions stored on at least one of the one or more computer-readable tangible storage devices. The program instructions are executable: determine, by an authentication service, whether the mobile device of the user is locked when the user approaches the secure facility and when the mobile device is connected to the authentication service through a wireless network at the secure facility; in response to determining that the mobile device is locked, request, by the authentication service, the user to unlock the mobile device, and determine whether the user has unlocked the mobile device; in response to determining that the user has unlocked the mobile device, retrieve, by the authentication service, from the mobile device, a first token and a media access control (MAC) address; retrieve, by the authentication service, from a database of the authentication service, a token identifier registered for the mobile device and a personal identifier registered for the user; generate, by the authentication service, a second token, based on the token identifier and the personal identifier retrieved from the database and based on the media access control (MAC) address retrieved from the mobile device; determine, by the authentication service, whether the first token and the second token match; in response to determining that the first token and the second token match, grant, by the authentication service, the user access to the secure facility.

In yet another aspect, a computer system for using a mobile device to authenticate a user to access a secure facility is provided. The computer system comprises one or more processors, one or more computer readable tangible storage devices, and program instructions stored on at least one of the one or more computer readable tangible storage devices for execution by at least one of the one or more processors. The program instructions are executable to determine, by an authentication service, whether the mobile device of the user is locked when the user approaches the secure facility and when the mobile device is connected to the authentication service through a wireless network at the secure facility. The program instructions are further executable to request, by the authentication service, the user to unlock the mobile device, and determine whether the user has unlocked the mobile device, in response to determining that the mobile device is locked. The program instructions are further executable to retrieve, by the authentication service, from the mobile device, a first token and a media access control (MAC) address, in response to determining that the user has unlocked the mobile device. The program instructions are further executable to retrieve, by the authentication service, from a database of the authentication service, a token identifier registered for the mobile device and a personal identifier registered for the user. The program instructions are further executable to generate, by the authentication service, a second token, based on the token identifier and the personal identifier retrieved from the database and based on the media access control (MAC) address retrieved from the mobile device. The program instructions are further executable to determine, by the authentication service, whether the first token and the second token match. The program instructions are further executable to grant, by the authentication service, the user access to the secure facility, in response to determining that the first token and the second token match.

BRIEF DESCRIPTION OF THE SEVERAL VIEWS OF THE DRAWINGS

FIG. 2 is a flowchart showing operational steps of an initial setup for using a mobile device to authenticate a user to access a secure facility, in accordance with one embodiment of the present invention.

DETAILED DESCRIPTION

Embodiments of the present invention present a method for utilizing a mobile device (for example a mobile phone) to authenticate a user to access a secure facility or a restricted area. The mobile device utilizes an authentication application installed on the mobile device to performs a connection, verification, authentication, and unlocking access (e.g., an entry door), when the user is in a range of the facility's wireless (e.g., Wi-Fi) network. An authentication service provides the user with authorization access to the secure facility or the restricted area, by granting access at the moment the user unlocks the mobile device. Access to the secure facility or the restricted area remains active for a specific time which is set up for the user by the authentication service based on access policies. In some embodiments of the present invention, the disclosed method may be utilized to access a device within the secure facility or the restricted area. In some other embodiments, biometric information can still be used, but the collection of such information is delegated to the mobile device that identifies the user.

In the embodiments of the present invention, the authentication application installed on the mobile device uses a token. The token is generated based on a media access control (MAC) address of the mobile device, a registered personal identifier (such as an email address of the user), and a unique token identifier (ID). Through the authentication application on the mobile device, the authentication service detects whether the mobile device is locked; detecting whether the mobile device is locked is part of an authentication process. User's unlocking the mobile device is also part of the authentication process. In the embodiments of the present invention, a certificate may be generated by the authentication service and deployed on the mobile device of the user. Use of the certificate in the mobile application allows the user to reenter to the secure facility or the secure area just by unlocking the mobile device.

The method disclosed in the embodiments of the present invention allows the user to utilize the mobile device to obtain access to the secure facility or the restricted area. Using the method disclosed in the embodiments of the present invention is more secure than carrying a badge. In the method disclosed in the embodiments of the present invention, using the registered personal identifier (such as an email address of the user) in a token adds another layer of security, because the user gets a notification when the token is created using the registered personal identifier (such as an email address of the user).

Figure 1:
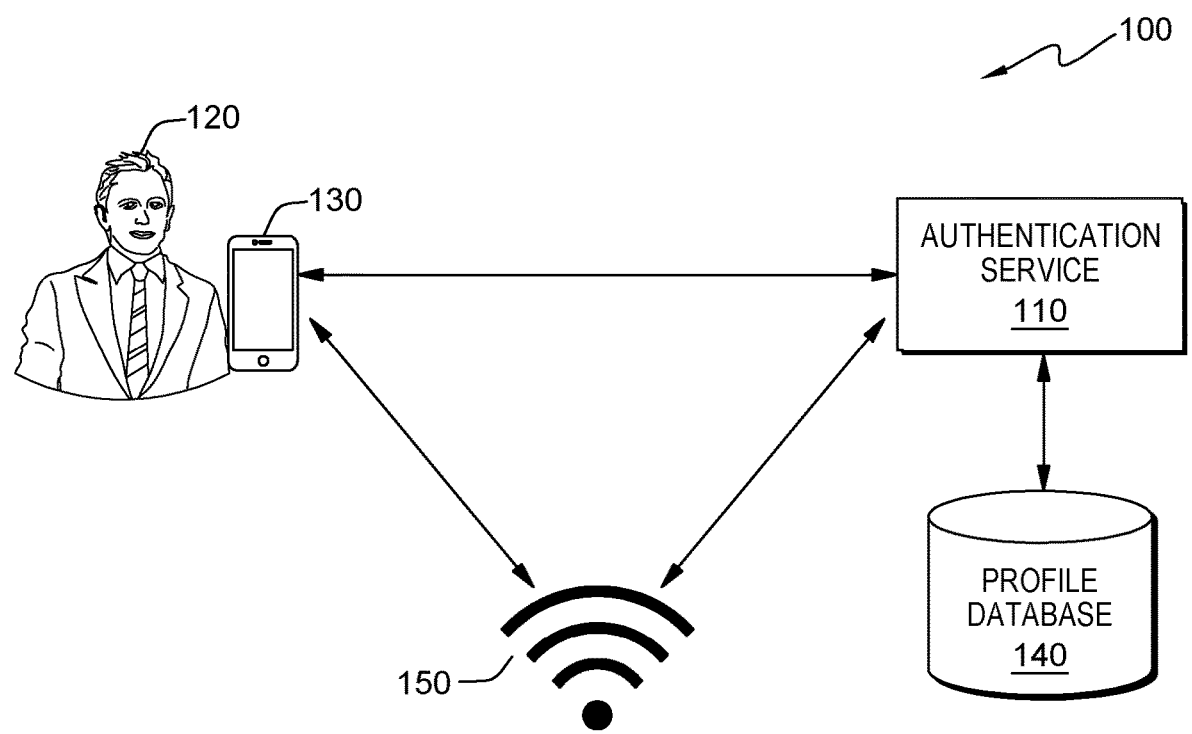
FIG. 1 is a systematic diagram showing an authentication system, in accordance with one embodiment of the present invention.

FIG. 1 is a systematic diagram showing an authentication system 100, in accordance with one embodiment of the present invention. The authentication system 100 includes an authentication service 110. The authentication service 110 provides a user 120 with authorized access to a secure facility or a restricted area. The user 120 with a mobile device 130 approaches a secure facility or a restricted area. The mobile device 130 connects to a wireless (e.g., Wi-Fi) network 150 at the secure facility or the restricted area, and an authentication application on the mobile device 130 notifies the authentication service 110 whether the mobile device 130 is locked or unlocked. The authentication system 100 further comprises a profile database 140. On the profile database 140, the authentication service 110 stores a registered personal identifier (such as an email address) of the user 120 and a unique token identifier (ID) registered for the mobile device 130, when the authentication service 110 implements an initial setup of the mobile device 130. When the authentication service 110 authenticates the user 120 to access the secure facility or the restricted area, the authentication service 110 retrieves from the profile database 140 the registered personal identifier (such as an email address) of the user 120 and the unique token identifier (ID) registered for the mobile device 130.

In an embodiment, the authentication service 110 and the profile database 140 are situated on a computer device or server. The computer device or severer is described in more detail in later paragraphs with reference to FIG. 5. In another embodiment, the authentication service 110 and the profile database 140 may be implemented on a virtual machine or another virtualization implementation being run on a computer device. In yet another embodiment, the authentication service 110 and the profile database 140 may be implemented in a cloud computing environment. The cloud computing environment is described in later paragraphs with reference to FIG. 6 and FIG. 7.

While the authentication service 110 and the profile database 140 may be situated on the same computer device or server, the authentication service 110 and the profile database 140 may be separately implemented on distributed computer devices or servers which are connected by a network or are in a cloud computing environment.

FIG. 2 is a flowchart showing operational steps of an initial setup for using a mobile device to authenticate a user to access at a secure facility or a restricted area, in accordance with one embodiment of the present invention. At step 201, a user logins on a mobile device using a default email address associated with the mobile device. In the embodiment shown in FIG. 1, the user 120 logins on the mobile device 130 using a default email address associated with the mobile device 130. At step 203, the mobile device connects to a wireless (e.g., Wi-Fi) network at work. In the embodiment shown in FIG. 1, the mobile device 130 connects to the wireless (e.g., Wi-Fi) network 150 at work. At step 205, the user downloads an authentication application onto the mobile device. At step 207, the user launches the authentication application which has been downloaded at step 205. At step 209, the mobile device connects to the authentication service. In the embodiment shown in FIG. 1, the mobile device 130 connects to the authentication service 110.

At step 211, the authentication service sends a request to ask the user to lock the mobile device. At step 212, the authentication service determines whether the mobile device is locked.

In response to determining that the mobile device is not locked (NO branch of decision step 212), at step 213, the authentication service rejects the user's access. The authentication service sends to the authentication application on the mobile device a notification and notifies that the user must lock the mobile device and retry an access request.

In response to determining that the mobile device is locked by the user (YES branch of decision step 212), at step 215, the authentication service retrieves, from the mobile device, a unique token identifier (ID) registered for the mobile device, a media access control address (MAC address) of the mobile device, and a registered personal identifier (such as an email address) of the user.

At step 217, the authentication service generates a token, based on the above-mentioned information retrieved at step 215. For example, the authentication service generates an encryption token, and the authentication service notifies the user, through the email address, that the token has been generated for the mobile device.

At step 219, the authentication service deploys the token on the mobile device. The token is used to authorize the mobile device to provide information back to the authentication service.

At step 221, the authentication service stores, on a database, the unique token identifier (ID) and the registered personal identifier (such as an email address) of the user. In the embodiment shown in FIG. 1, on the profile database 140, the authentication service 110 stores the unique token identifier (ID) and the registered personal identifier (such as an email address) of the user 120. At step 223, the initial setup is completed, and the mobile device is ready to be used in an authenticating process (which will be discussed in later paragraphs with reference FIG. 3 and FIG. 4).

Figure 3:
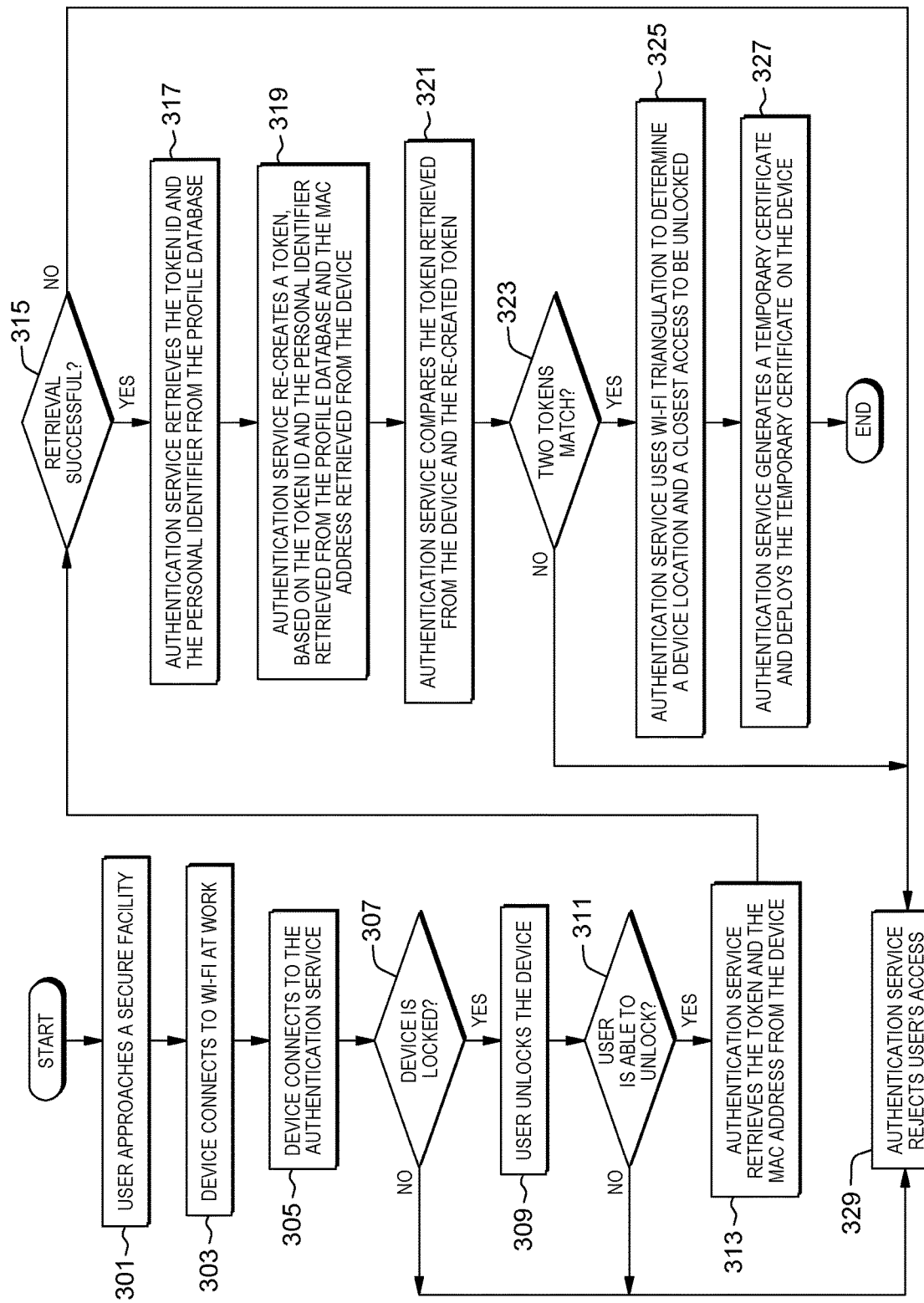
FIG. 3 is a flowchart showing operational steps for a first time of using a mobile device to authenticate a user to access a secure facility, in accordance with one embodiment of the present invention.

FIG. 3 is a flowchart showing operational steps for a first time of using a mobile device to authenticate a user to access a secure area, in accordance with one embodiment of the present invention. At step 301, a user (e.g., the user 120 shown in FIG. 1) approaches a secure facility or a restricted area. At step 303, a mobile device of the user connects to a wireless (e.g., Wi-Fi) network at work. In the embodiment shown in FIG. 1, the mobile device 130 connects to the wireless (e.g., Wi-Fi) network 150 at the secure facility or the restricted area. At step 305, the mobile device connects to an authentication service and notifies the authentication service whether the mobile device is locked or not. In the embodiment shown in FIG. 1, the mobile device 130 connects to the authentication service 110.

At step 307, the authentication service determines whether the mobile device is locked. In response to determining that the mobile device is not locked (NO branch of decision step 307), at step 329, the authentication service rejects the user's access. The authentication service sends to the authentication application on the mobile device a notification and notifies that the user must lock the mobile device and retry an access request. In response to determining that the mobile device is locked by the user (YES branch of decision step 307), the authentication service requests the user to unlock the mobile device. At step 309, the user unlocks the mobile device.

At step 311, the authentication service determines whether the user is able to unlock the mobile device or the user has unlocked the mobile device. In response to determining that the user is not able to unlock the mobile device or the user has not unlocked the mobile device (NO branch of decision step 311), at step 329, the authentication service rejects the user's access and sends the notification to the authentication application on the mobile device.

In response to determining that the mobile device is able to unlock the mobile device or the user has unlocked the mobile device (YES branch of decision step 311), at step 313, the authentication service retrieves, from the mobile device, a token and a media access control address (MAC address) of the mobile device. The token has been generated by the authentication service at step 217 shown in FIG. 2 and deployed by the authentication service onto the mobile device at step 219 shown in FIG. 2.

At step 315, the authentication service determines whether retrieval at step 313 is successful. In other words, the authentication service determines whether the token and the MAC address of the mobile device are successfully retrieved. In response to determining that retrieval at step 313 is unsuccessful (NO branch of decision step 315), at step 329, the authentication service rejects the user's access and sends the notification to the authentication application on the mobile device.

In response to determining that retrieval at step 313 is successful (YES branch of decision step 315), at step 317, the authentication service retrieves, from a profile database, a unique token identifier (ID) registered for the mobile device and a registered personal identifier (such as an email address) of the user. The unique token identifier (ID) and the registered personal identifier (such as an email address) have been stored on the profile database by the authentication service at step 221 shown in FIG. 2. In the embodiment shown in FIG. 1, from the profile database 140, the authentication service 110 retrieves the unique token identifier (ID) and the registered personal identifier (such as an email address).

At step 319, the authentication service re-creates a token, based on the unique token identifier (ID) and the registered personal identifier (such as an email address) retrieved from the profile database at step 317 and further based the MAC address retrieved from the mobile device at step 313.

At step 321, the authentication service compares the token retrieved from the mobile device at step 313 and the token re-created at step 319. Then, at step 323, the authentication service determines whether two tokens (the token retrieved from the mobile device and the token re-created) match.

In response to determining that the two tokens do not match (NO branch of decision step 323), at step 329, the authentication service rejects the user's access and sends the notification to the authentication application on the mobile device.

In response to determining that the two tokens match (YES branch of decision step 323), the authentication service grants the user to access the secure facility or the restricted area. At step 325, the authentication service uses wireless triangulation (e.g., Wi-Fi triangulation) to determine a location of the mobile device and closest access to be unlocked.

At step 327, the authentication service generates a temporary certificate and deploys the temporary certificate on the mobile device. The temporary certificate is generated by the authentication service based on a predetermined policy; the predetermined policy may include, for example, certain hours or days, working hours of a specific user, or types of users. The temporary certificate on the mobile device allows the user to access the secure facility or the restricted area until the temporary certificate expires. The steps for using the temporary certificate to access the secure facility or the restricted area are presented in later paragraphs with reference to FIG. 4. With the temporary certificate on the mobile device, the user may unlock other access to the secure facility or the restricted area while the temporary certificate is valid.

Figure 4:
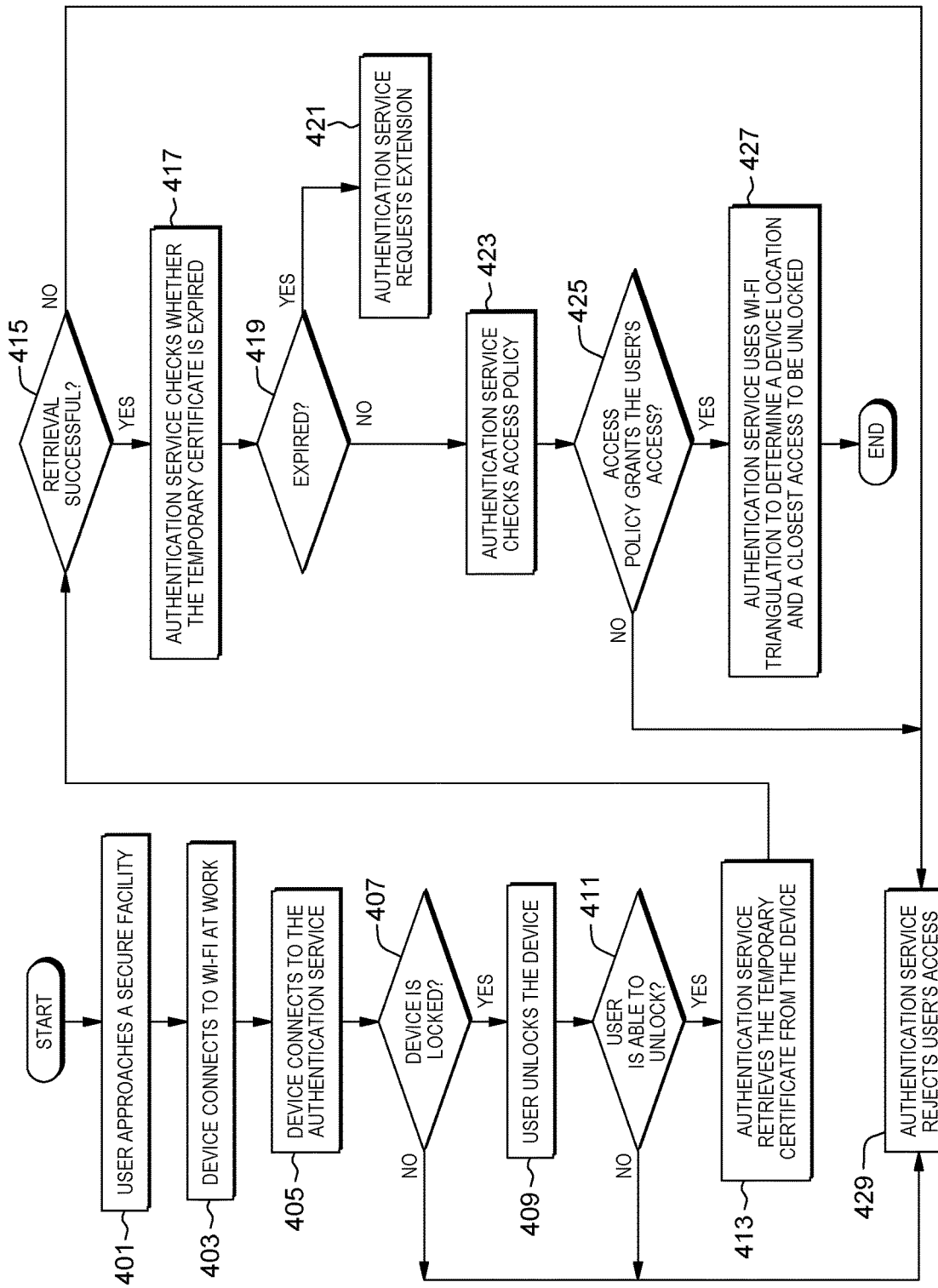
FIG. 4 is a flowchart showing operational steps for a subsequent request of using a mobile device to authenticate a user to access a secure facility, in accordance with one embodiment of the present invention.

FIG. 4 is a flowchart showing operational steps for a subsequent request of using a mobile device to authenticate a user to access a secure area, in accordance with one embodiment of the present invention. At step 401, a user (e.g., the user 120 shown in FIG. 1) approaches a secure facility or a restricted area. At step 403, a mobile device of the user connects to a wireless (e.g., Wi-Fi) network at work. In the embodiment shown in FIG. 1, the mobile device 130 connects to the Wi-Fi network 150 at the secure facility or the restricted area. At step 405, the mobile device connects to an authentication service and notifies the authentication service whether the mobile device is locked or not. In the embodiment shown in FIG. 1, the mobile device 130 connects to the authentication service 110.

At step 407, the authentication service determines whether the mobile device is locked. In response to determining that the mobile device is not locked (NO branch of decision step 407), at step 429, the authentication service rejects the user's access. The authentication service sends to the authentication application on the mobile device a notification and notifies that the user must lock the mobile device and retry an access request. In response to determining that the mobile device is locked by the user (YES branch of decision step 407), the authentication service requests the user to unlock the mobile device. At step 409, the user unlocks the mobile device.

At step 411, the authentication service determines whether the user is able to unlock the mobile device or the user has unlocked the mobile device. In response to determining that the user is not able to unlock the mobile device or the user has not unlocked the mobile device (NO branch of decision step 411), at step 429, the authentication service rejects the user's access and sends the notification to the authentication application on the mobile device.

In response to determining that the user is able to unlock the mobile device or the user has unlocked the mobile device (YES branch of decision step 411), at step 413, the authentication service retrieves, from the mobile device, a temporary certificate. The temporary certificate has been generated and deployed on the mobile device of the user by the authentication service at step 327 shown in FIG. 3.

At step 415, the authentication service determines whether retrieval at step 413 is successful. In other words, the authentication service determines whether the temporary certificate is successfully retrieved. In response to determining that retrieval at step 413 is unsuccessful (NO branch of decision step 415), at step 429, the authentication service rejects the user's access and sends the notification to the authentication application on the mobile device. In response to determining that retrieval at step 413 is successful (YES branch of decision step 415), at step 417, the authentication service checks whether the temporary certificate is expired.

In response to determining that the temporary certificate is not expired (NO branch of decision step 419), at step 423, the authentication service checks policies of access to the secure facility or the restricted area. At step 425, the authentication service determines whether the access policies grant the user the access to the secure facility or the restricted area.

In response to determining that the access policies do not grant the user the access (NO branch of decision step 425), at step 429, the authentication service rejects the user's access and sends the notification to the authentication application on the mobile device.

In response to determining that the access policies grant the user the access (YES branch of decision step 425), the authentication service grants the user to access the secure facility or the restricted area. At step 427, the authentication service uses wireless triangulation (e.g., Wi-Fi triangulation) to determine a location of the mobile device and closest access to be unlocked.

In response to determining that the temporary certificate is expired (YES branch of decision step 419), at step 421, the authentication service requests the user to extend the temporary certificate. If the user is still within a range of the wireless network at the secure facility or the restricted area and the mobile device is on, the temporary certificate can be extended beyond an expiration time period.

Figure 5:
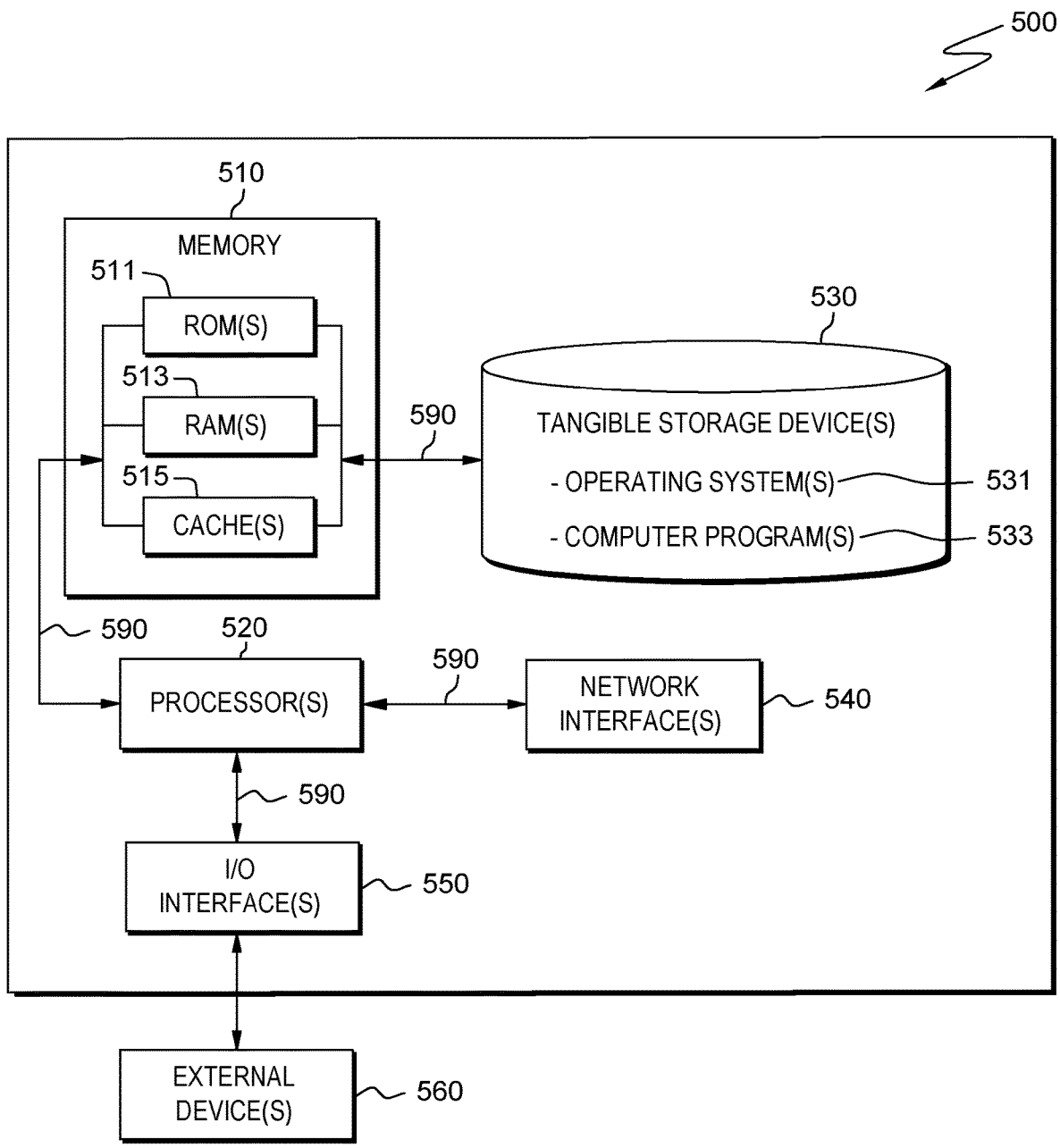
FIG. 5 is a diagram illustrating components of a computer device, in accordance with one embodiment of the present invention.

FIG. 5 is a diagram illustrating components of computer device 500, in accordance with one embodiment of the present invention. It should be appreciated that FIG. 5 provides only an illustration of one implementation and does not imply any limitations with regard to the environment in which different embodiments may be implemented.

Referring to FIG. 5, computer device 500 includes processor(s) 520, memory 510, and tangible storage device(s) 530. In FIG. 5, communications among the above-mentioned components of computer device 500 are denoted by numeral 590. Memory 510 includes ROM(s) (Read Only Memory) 511, RAM(s) (Random Access Memory) 513, and cache(s) 515. One or more operating systems 531 and one or more computer programs 533 reside on one or more computer readable tangible storage device(s) 530.

Computer device 500 further includes I/O interface(s) 550. I/O interface(s) 550 allows for input and output of data with external device(s) 560 that may be connected to computer device 500. Computer device 500 further includes network interface(s) 540 for communications between computer device 500 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
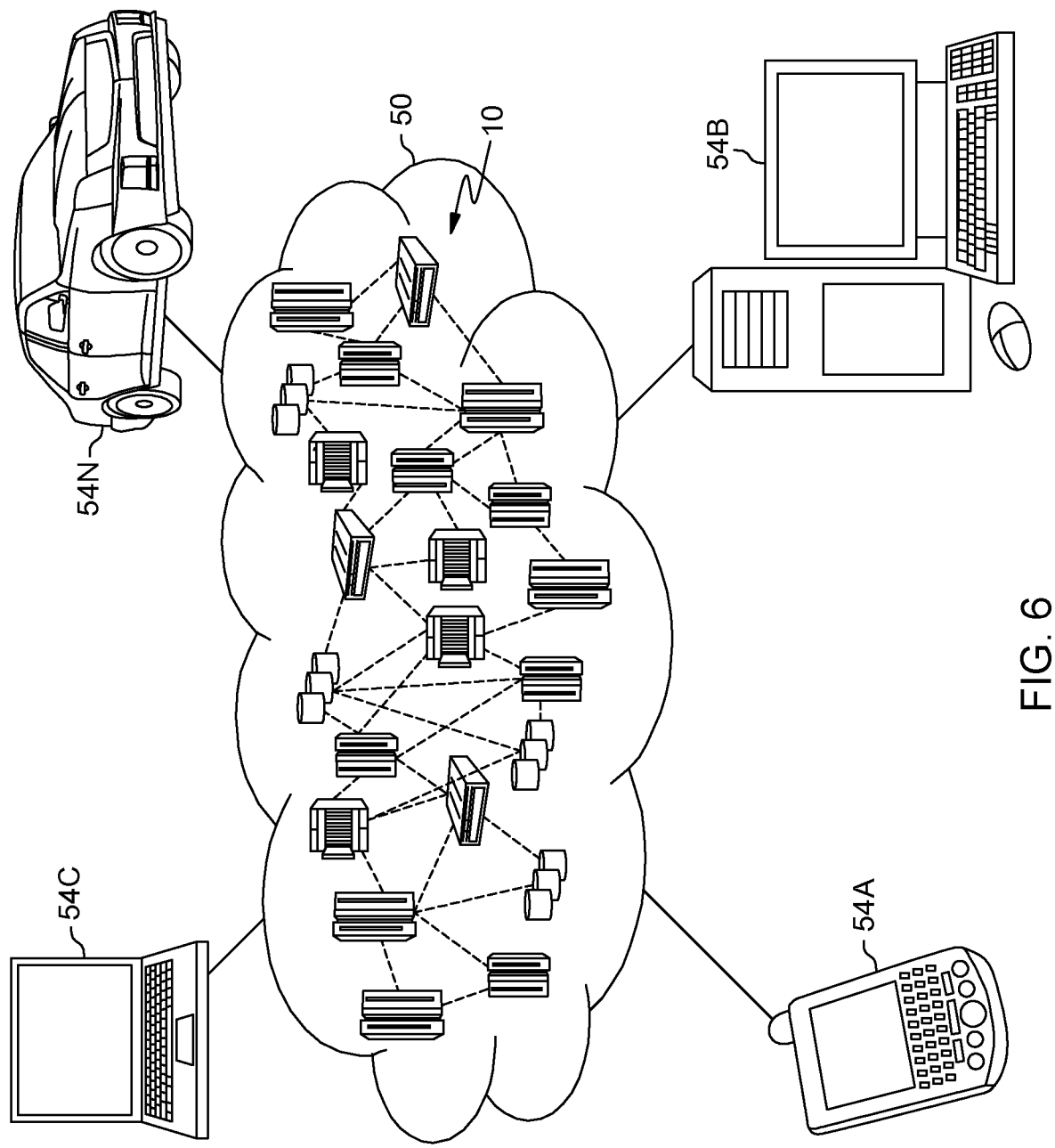
FIG. 6 depicts a cloud computing environment, in accordance with one embodiment of the present invention.

Referring now to FIG. 6, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 7:
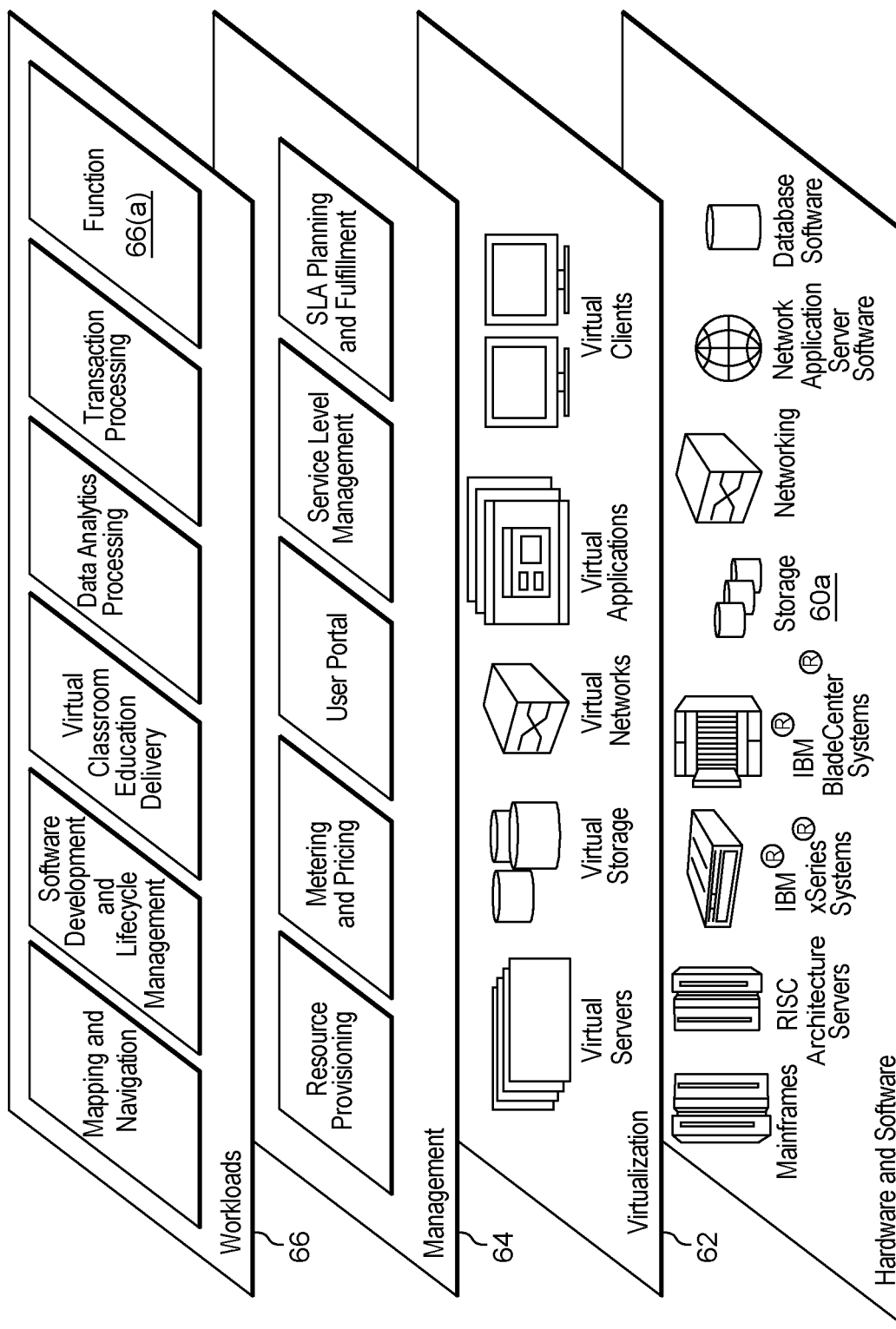
FIG. 7 depicts abstraction model layers in a cloud computing environment, in accordance with one embodiment of the present invention.

Referring now to FIG. 7, a set of functional abstraction layers provided by cloud computing environment 50 (shown FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes, RISC (Reduced Instruction Set Computer) architecture based servers, servers, blade servers, storage devices, and networks and networking components. In some embodiments, software components include network application server software and database software.

Virtualization layer 62 provides an abstraction layer from which the following examples of virtual entities may be provided: virtual servers, virtual storage, virtual networks, including virtual private networks, virtual applications and operating systems, and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User Portal provides access to the cloud computing environment for consumers and system administrators. Service Level Management provides cloud computing resource allocation and management such that required service levels are met. Service Level Agreement (SLA) Planning and Fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: Mapping and Navigation, Software Development and Lifecycle Management, Virtual Classroom Education Delivery, Data Analytics Processing, Transaction Processing, and functionality according to the present invention (Function 66a). In embodiments of the present invention, function 66a is the authentication service shown in FIG. 1.

What is claimed is:

1. A computer-implemented method for using a mobile device to authenticate a user to access a secure facility, the method comprising:
  determining, by an authentication service, whether the mobile device of the user is locked when the user approaches the secure facility and when the mobile device is connected to the authentication service through a wireless network at the secure facility;
  in response to determining that the mobile device is locked, requesting, by the authentication service, the user to unlock the mobile device, and determining whether the user has unlocked the mobile device;

in response to determining that the user has unlocked the mobile device, retrieving, by the authentication service, from the mobile device, a first token and a media access control (MAC) address;

retrieving, by the authentication service, from a database of the authentication service, a token identifier registered for the mobile device and a personal identifier registered for the user;

generating, by the authentication service, a second token, based on the token identifier and the personal identifier retrieved from the database and based on the media access control (MAC) address retrieved from the mobile device;

determining, by the authentication service, whether the first token and the second token match; and in response to determining that the first token and the second token match, granting, by the authentication service, the user access to the secure facility;

in response to determining, when the user approaches the secure facility and when the mobile device is connected to the authentication service through a wireless network at the secure facility, that the mobile device is not locked, rejecting, by the authentication service, the user the access to the secure facility, and requesting the user to lock the mobile device.

2. The computer-implemented method of claim 1, further comprising: in response to determining that the user has not unlocked the device, rejecting, by the authentication service, the user the access to the secure facility.

3. The computer-implemented method of claim 1, further comprising: in response to determining that the first token and the second token do not match, rejecting, by the authentication service, the user the access to the secure facility.

4. The computer-implemented method of claim 1, further comprising: in response to determining that the first token and the second token match, generating, by the authentication service, a certificate for the user to access the secure facility; and deploying, by the authentication service, the certificate on the mobile device.

5. The computer-implemented method of claim 4, further comprising: retrieving, by the authentication service, from the mobile device of the user, the certificate;

determining, by the authentication service, whether the certificate is expired; and in response to determining that the certificate is not expired, checking, by the authentication service, access policies; and in response to determining that the access policies grant the user to access, granting, by the authentication service, the user the access to the secure facility.

6. The computer-implemented method of claim 5, further comprising: in response to determining that the certificate is expired, requesting, by the authentication service, the user to extend the certificate.

7. A computer program product for using a mobile device to authenticate a user to access a secure facility, the computer program product comprising one or more computer-readable tangible storage devices and program instructions stored on at least one of the one or more computer-readable tangible storage devices, the program instructions executable to:

determine, by an authentication service, whether the mobile device of the user is locked when the user approaches the secure facility and when the mobile device is connected to the authentication service through a wireless network at the secure facility;

in response to determining that the mobile device is locked, request, by the authentication service, the user to unlock the mobile device, and determine whether the user has unlocked the mobile device;

in response to determining that the user has unlocked the mobile device, retrieve, by the authentication service, from the mobile device, a first token and a media access control (MAC) address;

retrieve, by the authentication service, from a database of the authentication service, a token identifier registered for the mobile device and a personal identifier registered for the user;

generate, by the authentication service, a second token, based on the token identifier and the personal identifier retrieved from the database and based on the media access control (MAC) address retrieved from the mobile device;

determine, by the authentication service, whether the first token and the second token match; and in response to determining that the first token and the second token match, grant, by the authentication service, the user access to the secure facility, wherein the secure facility comprises a building and the granting the user access to the secure facility comprises unlocking an entry door;

in response to determining, when the user approaches the secure facility and when the mobile device is connected to the authentication service through a wireless network at the secure facility, that the mobile device is not locked, rejecting, by the authentication service, the user the access to the secure facility, and requesting the user to lock the mobile device.

8. The computer program product of claim 7, further comprising the program instructions executable to: in response to determining that the user has not unlocked the device, reject, by the authentication service, the user the access to the secure facility.

9. The computer program product of claim 7, further comprising the program instructions executable to: in response to determining that the first token and the second token do not match, reject, by the authentication service, the user the access to the secure facility.

10. The computer program product of claim 7, further comprising the program instructions executable to: in response to determining that the first token and the second token match, generate, by the authentication service, a certificate for the user to access the secure facility; and deploying, by the authentication service, the certificate on the mobile device.

11. The computer program product of claim 10, further comprising the program instructions executable to: retrieve, by the authentication service, from the mobile device of the user, the certificate; determine, by the authentication service, whether the certificate is expired; and in response to determining that the certificate is not expired, check, by the authentication service, access policies; and in response to determining that the access policies grant the user to access, grant, by the authentication service, the user the access to the secure facility.

12. The computer program product of claim 11, further comprising the program instructions executable to: in response to determining that the certificate is expired, request, by the authentication service, the user to extend the certificate.

13. A computer system for using a mobile device to authenticate a user to access a secure facility, the computer system comprising:
- one or more processors, one or more computer readable tangible storage devices, and program instructions stored on at least one of the one or more computer readable tangible storage devices for execution by at least one of the one or more processors, the program instructions executable to:
- determine, by an authentication service, whether the mobile device of the user is locked as the user approaches the secure facility and when the mobile device is connected to the authentication service through a wireless network at the secure facility; in response to determining that the mobile device is locked as the user approaches the secure facility, request, by the authentication service, the user to unlock the mobile device, and determine whether the user has unlocked the mobile device;
- in response to determining that the user has unlocked the mobile device, retrieve, by the authentication service, from the mobile device, a first token and a media access control (MAC) address;
- retrieve, by the authentication service, from a database of the authentication service, a token identifier registered for the mobile device and a personal identifier registered for the user;
- generate, by the authentication service, a second token, based on the token identifier and the personal identifier retrieved from the database and based on the media access control (MAC) address retrieved from the mobile device;
- determine, by the authentication service, whether the first token and the second token match; and
- in response to determining that the first token and the second token match, grant, by the authentication service, the user access to the secure facility, wherein the secure facility comprises a building and the granting the user access to the secure facility comprises:
- determining, using Wi-Fi triangulation, a location of the mobile device of the user and a door of the building closest to the location of the mobile device of the user; and
- unlocking the door of the building closest to the location of the mobile device of the user
- in response to determining, when the user approaches the secure facility and when the mobile device is connected to the authentication service through a wireless network at the secure facility, that the mobile device is not locked, rejecting, by the authentication service, the user the access to the secure facility, and requesting the user to lock the mobile device.

14. The computer system of claim 13, further comprising the program instructions executable to: in response to determining that the user has not unlocked the device, reject, by the authentication service, the user the access to the secure facility.

15. The computer system of claim 13, further comprising the program instructions executable to: in response to determining that the first token and the second token do not match, reject, by the authentication service, the user the access to the secure facility.

16. The computer system of claim 13, further comprising the program instructions executable to: in response to determining that the first token and the second token match, generate, by the authentication service, a certificate for the user to access the secure facility; and deploying, by the authentication service, the certificate on the mobile device.

17. The computer system of claim 16, further comprising the program instructions executable to:
- retrieve, by the authentication service, from the mobile device of the user, the certificate;
- determine, by the authentication service, whether the certificate is expired;
  - in response to determining that the certificate is not expired, check, by the authentication service, access policies;
  - in response to determining that the access policies grant the user to access, grant, by the authentication service, the user the access to the secure facility; and
  - in response to determining that the certificate is expired, request, by the authentication service, the user to extend the certificate.

\* \* \* \* \*